Dec. 20, 1966 J. R. LYNCH 3,292,811
DISPENSING CONTAINER
Original Filed Dec. 17, 1962 2 Sheets-Sheet 1
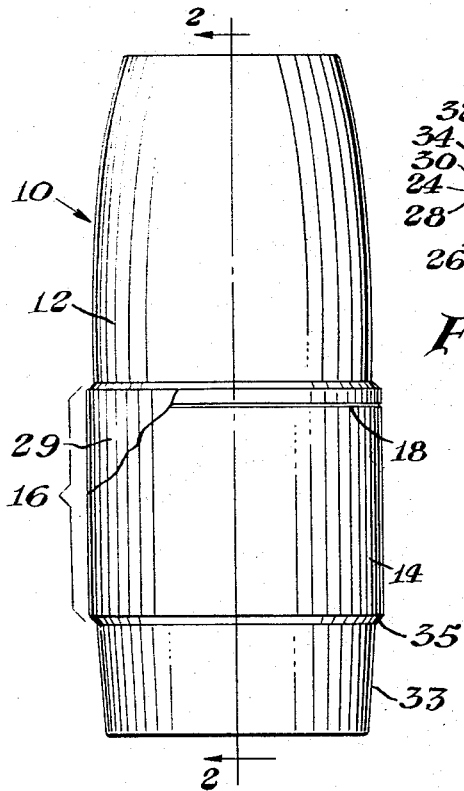
Fig. 1
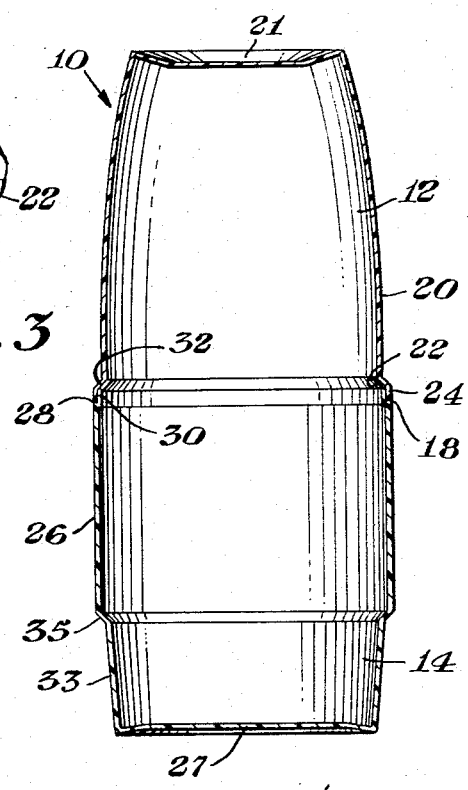
Fig. 3
Fig. 2
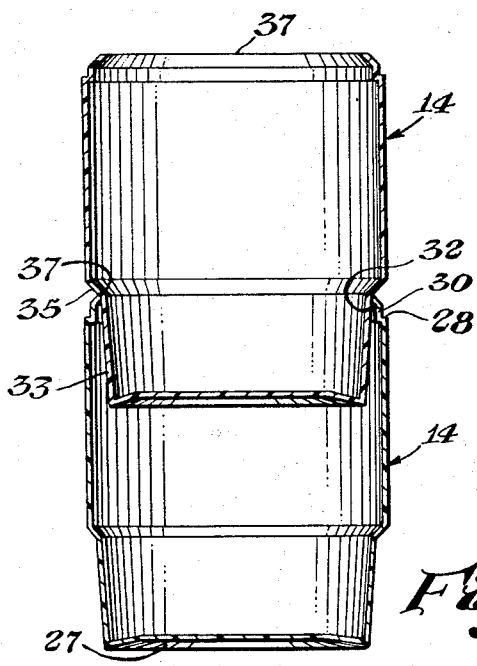
Fig. 4
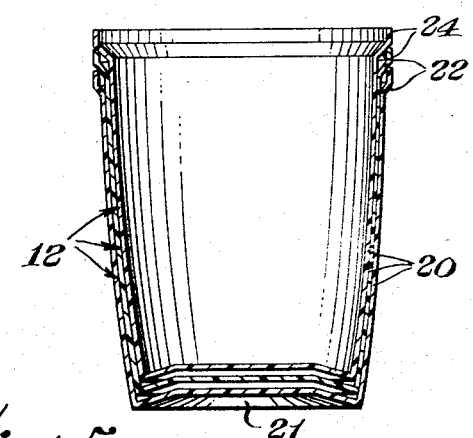
Fig. 5
INVENTOR.
John R. Lynch
BY
ATTORNEY Dec. 20, 1966  J. R. LYNCH  3,292,811
DISPENSING CONTAINER
Original Filed Dec. 17, 1962  2 Sheets-Sheet 2

INVENTOR.
John R. Lynch
BY
ATTORNEY

United States Patent Office 3,292,811
Patented Dec. 20, 1966

3,292,811
DISPENSING CONTAINER
John R. Lynch, Midland, Mich., assignor to The Dow Chemical Company, Midland, Mich., a corporation of Delaware
Original application Dec. 17, 1962, Ser. No. 245,256, now Patent No. 3,215,300. Divided and this application Mar. 2, 1965, Ser. No. 441,401
2 Claims. (Cl. 220—4)

This application is a division of application Serial No. 245,256, filed December 17, 1962 and now issued as U.S. Patent No. 3,215,300.

This invention relates generally to formed plastic containers and, more specifically, relates to formed plastic containers for the dispensing of granular, powdered or liquid substances such as household cleansers, sugar, salt, milk or the like, and methods relating to the assembly of component parts of such containers as well as their nesting characteristics for pre-fill shipping.

It has not been unusual in forming dispensing containers of the nature herein described, to form the same of two components, one of the components being fabricated with a receiving portion while the other component is fabricated with an inserting portion for engagement with the first mentioned component. It is necessary that these components be designed so as to be nestable for pre-fill shipment, as well as being adapted for withstanding substantial abuse during shipping and handling to and by the retail merchant and ultimate consumer. Prior containers have not been completely satisfactory in fulfilling all of these needs, and particularly fail where the component parts are joined, the seam thereof often "crazing," i.e., cracking (of the plastic) due to brittle fracture. Thus the simple lap seam of the prior art has not produced a fully satisfactory container, neither for assembly purposes nor for handling and ultimate consumer use.

Accordingly, it is an object of the present invention to provide a dispensing container of a more durable quality than that heretofore known.

Another object of the present invention is to provide a dispensing container, the components of which are readily assembled with or without the use of solvents or additional adhesives.

A still further object of the present invention is the provision of a dispensing container wherein the component parts thereof will not become disengaged nor will they break due to reasonable abuse in handling and ultimate consumer use.

A still further object of the present invention is the provision of a plastic formed container, the component parts of which are adapted to mate in a novel and highly efficient manner.

Briefly then, the present invention provides that components of a plastic formed container are formed such that one part is guided into the other, by inclined mating and flange surfaces of the two components, whereby the latter reinforces the former against breaking, as well as provides for a superior sealed assembly with an attractive jointure, the components also being nestable for shipment prior to assembly.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, in which:

FIGURE 1 is an elevational view of a dispensing container constructed according to the principles of the present invention, the sides thereof not illustrated being the same as the side shown, the horizontal cross section thereof being preferably of a circular configuration;

FIGURE 2 is a vertical cross-sectional view thereof taken along reference line 2—2 of FIGURE 1;

FIGURE 3 is an enlarged fragmentary sectional view showing a modified form of jointure for the container of FIGURE 1;

FIGURE 4 is a vertical cross-sectional view of a plurality of the lower components of the container of FIGURE 1, in a nested relationship;

FIGURE 5 is a vertical cross-sectional view of a plurality of the upper components of the container of FIGURE 1, in a nested relationship;

Figure 6:
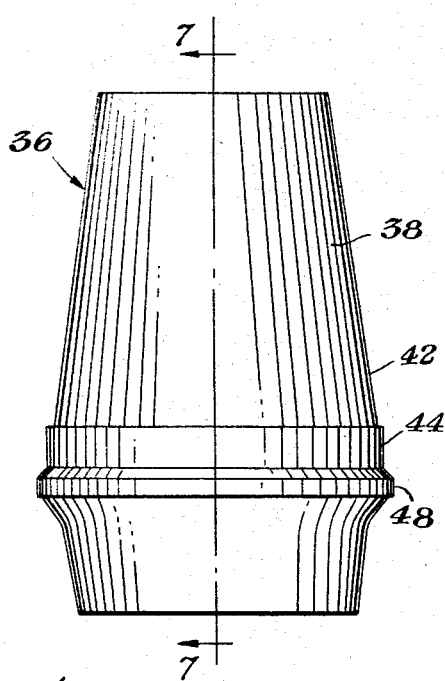
FIGURE 6 is an elevational view of a modified form of dispensing container constructed according to the principles of the present invention, the sides thereof not illustrated being the same as the side shown, the horizontal cross section thereof being preferably of a circular configuration.

Referring now more particularly to FIGURES 1 and 2, there is illustrated a dispensing container 10 comprising an upper receiving component 12 and a lower inserting component 14. A label area 16 extends partly over the distance of both components 12 and 14 with the otherwise visible jointure or seam 18 between components 12 and 14 being located in the label area 16. Components 12 and 14 can be formed of some polymeric plastic material which is readily formable into desired shapes. Such materials can include polyolefins like polyethylene and polypropylene, or polystyrene, or other similar thermoplastics.

As here illustrated, upper component 12 includes side wall 20 extending downwardly from top wall 21 and having a portion presenting an inclined, outwardly extending surface 32 and a downwardly extending substantially vertical flange portion 24 extending from the lower extremity of side wall 20. Top wall 21 can include sealed over perforations (not shown) for dispensing materials from the container, or perforations can be made therein when desired by the ultimate consumer.

Lower component 14 includes side wall 26 extending upwardly from bottom wall 27 and which, at its upper extremity, includes shoulder 28 sufficient to receive flange 24 so that its outer surface is substantially flush with the outer surface of side wall 26. Seam 18 thus can be hid by a label 29 about area 16. Extending upwardly from shoulder 28 is a substantially vertical flange 30 having a portion presenting an inclined inwardly extending surface 32 extending upwardly therefrom at generally the same angular disposition as slanting surface 22. Thus, it can readily be seen that portions 30 and 32 of the inserted component 14 substantially mate with end portions 22 and 24 of receiving component 12.

Mating surfaces 22 and 32 can be referred to as sealing areas that are purposely inclined such that they can be readily adhered to one another by such techniques as spin welding or solvent coating such that any applied stresses to the side walls 20 and 26 of the container will be dissipated over a larger section of the stressed member. Usable solvents could be perchloroethylene, toluene, or methylene chloride, for example. Furthermore, these inclined surfaces are extensions of the side walls which provide extra material to reinforce the jointure 18 as well as the overall structure of the containers. In addition, containers of such a construction will have a built-in piloting system wherein the inserted component 14 is guided into its proper relationship with the receiving component 12 by mating surfaces 22 and 32 when they are assembled together. Thus, in summary, it can be seen that mating surfaces 22 and 32, because of their inclined nature, here being shown at a 45° angle but not limited to this particular inclination, accomplish the function of piloting the component parts together, provide for reinforcement of the upper component and jointure against breaking, and provide for spin welding or other practical assembling techniques.

FIGURE 3 shows the alternative of sealing the mating surfaces 22, 32 and 24, 30 together by means of an adhesive 34 therebetween. However, if desired, the components 12 and 14 will probably stay secure for most applications if only the inclined surfaces 22 and 32 are secured together. Such an adhesive 34 could be a latex emulsion type, an epoxy resin type, an animal type glue, or the like.

One of the reasons for making container 10 of two component parts is to render them more economically shippable for they can then be transported in their prefilled condition in a nested or stacked state to conserve space. Thus, a plurality of lower components 14 as shown in FIGURE 4, have their bottom portions 33, each located below label area 16 and joined thereto by tapered or inclined ridge 35, nested within one another. Inclined surface 32 forms a lip 37 defining an opening thereacross of a greater width than that of bottom portion 33 so that the latter part of one component fits within the former part of the next lower component with the ridge 35 supported by lip 37, the taper of the ridge piloting it into a proper position within the lip, and so on for each subsequent nested component. Likewise, as illustrated in FIGURE 5, a plurality of upper components 12 can be readily nested such that side walls 20 fit within one another with the inclined surface 22 of one component resting upon the upper extremity of flange 24 of the next lower component 12.

Figure 7:
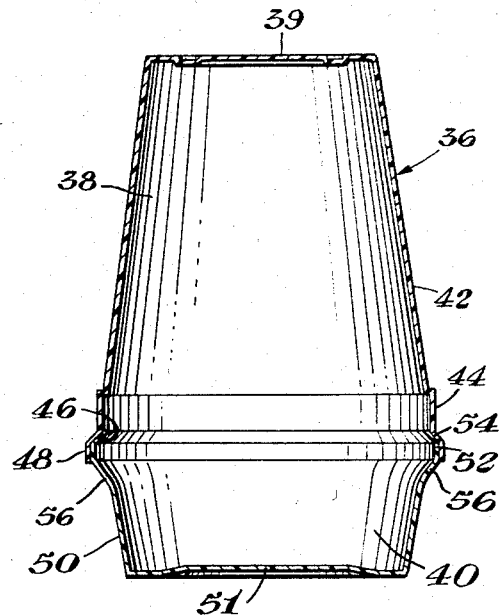
FIGURE 7 is a vertical cross-sectional view of the container illustrated in FIGURE 6 taken along reference line 6—6 thereof.

Referring now more particularly to FIGURES 6 and 7, there is shown a modified form of a container 36 including an upper receiving component 38 and a lower inserting component 40. Upper component 38 includes side wall 42 extending downwardly from top wall 39 and having an offset vertical section 44 from which a portion having an inclined inwardly extending surface 46 and a downwardly extending flange 48 extends therefrom, these being similar to the surface 22 and flange 24 of container 10, as previously described. Likewise, perforations (not shown) can be included in top wall 39 if desired. Lower component 40 includes side wall 50 extending upwardly from bottom wall 51, side wall 50 veering concavely outwardly near its upper extremity into an upwardly extending flange 52 and a portion presenting an inclined inwardly extending surface 54, these being similar to the flange 30 and surface 32 of container 10 as previously described.

However, one difference between the mating components 46, 54 and 48, 52 of container 36 and their corresponding portions in the container 10, is that a seam equivalent to that of seam 18 of container 10 is not present in the former, it appearing to the ultimate consumer that container 36 is of a one-piece (non-seam) construction. The sharply veering portion 56 of container 36 presents such an appearance since it eliminates the necessity for a shoulder 28 as in container 10.

Figure 8:
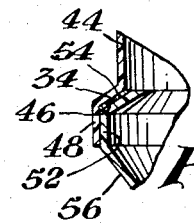
FIGURE 8 is an enlarged fragmentary sectional view showing a modified form of jointure for the container of FIGURE 6.

FIGURE 8, like FIGURE 3, presents an alternative to the spin welding technique employed in FIGURES 6 and 7, whereby an adhesive 34 can be used to join mating surfaces 46 and 54 together. Flanges 48 and 52 can also be sealed together if desired, although not shown so engaged.

Figure 9:
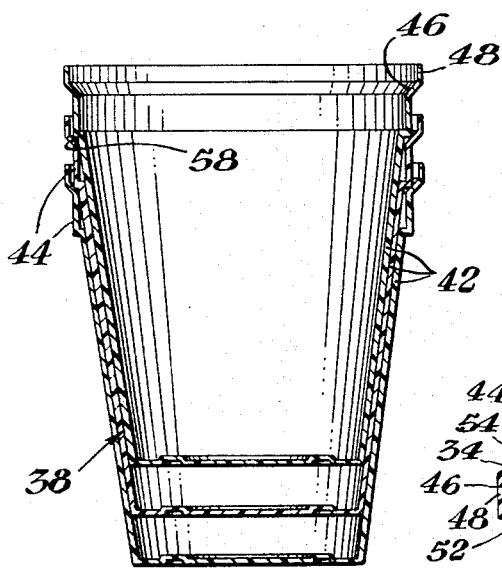
FIGURE 9 is a vertical cross-sectional view of a plurality of the lower components of the container of FIGURE 6, in a nested relationship.

The side walls 42 of upper components 38 can be substantially nested together, as in FIGURE 9, with a shoulder portion 58 formed between vertical flange 44 and the side wall 42 forming an offset which rests upon an inclined surface 46 of the next lower component.

Figure 10:
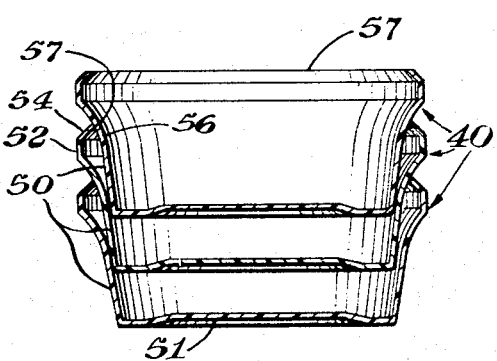
FIGURE 10 is a vertical cross-sectional view of a plurality of the upper components of the container of FIGURE 6, in a nested relationship.

The nestability of bottom components 40, as in FIGURE 10, is such that the concavely outwardly veering peripheral portion 56 of nested side walls 50 rests upon the lip 57 formed by the extremity of the inclined surface 54 of the next lower component.

Particular attention is drawn to the stacking of the lower components 14 and 40 of containers 10 and 36, respectively, as depicted in FIGURES 4 and 10. A positive stacking of the nested components 14 and 40, readily separable when desired, is accomplished by the inwardly and angularly directed lips 37 and 57 which receive tapered sections 35 and 56 of their respective sidewalls on the next adjacent similar component. Thus, one component is piloted into the next by way to the tapered sections, which in turn are held in a proper spaced relationship by the inwardly directed lips so as to prevent binding between the sidewalls of adjacent nested components.

While certain representative embodiments and details have been shown for the purpose of illustrating the invention, it will be apparent to those skilled in the art that various changes and modifications can be made therein without departing from the spirit and scope of the invention.

What is claimed as new is:

1. A container comprising the combination of an upper component and a lower component, said upper component including a side wall, an inclined portion extending generally downwardly and upwardly from the lower periphery of said upper component's side wall, a flange extending downwardly from the lower periphery of said upper component's inclined portion, said lower component including a side wall having an upwardly extending and concavely outwardly veering peripheral portion, a flange extending upwardly from the periphery of said outwardly veering portion, an inclined portion extending generally upwardly and inwardly from the upper periphery of said lower component's flange, the inclined portion and flange of said upper component having generally the same extent and angularity as the inclined portion and flange of said lower component, at least one of said inclined portion and flange being sealingly engaged with the other of said inclined portion and flange whereby the jointure between said components is not readily apparent.

2. A container comprising the combination of an upper component and a lower component, said upper component including a side wall, an inclined portion extending generally downwardly and outwardly from the lower periphery of said upper component's side wall, a flange extending downwardly from the lower periphery of said upper component's inclined portion, said lower component including a side wall having an upwardly extending and concavely outwardly veering peripheral portion, a flange extending upwardly from the periphery of said outwardly veering portion, an inclined portion extending generally upwardly and inwardly from the upper periphery of said lower component's flange, the inclined portion and flange of said upper component having generally the same extent and angularity as the inclined portion and flange of said lower component, at least one of said inclined portion and flange being sealingly engaged with the other of said inclined portion and flange, each of said inclined portions and said flanges presenting a circular horizontal cross section adapted for spin welding as well as other sealing techniques, whereby the jointure between said components is not readily apparent.

References Cited by the Examiner
UNITED STATES PATENTS

| | | | |
|---|---|---|---|
| 216,831 | 6/1879 | Collings | 220—4 |
| 2,426,289 | 8/1947 | Wallace. | |

THERON E. CONDON, *Primary Examiner.*

GEORGE E. LOWRANCE, *Examiner.*